A. N. CHENOWETH.
AUTOMATIC GEAR SHIFT FOR AUTOMOBILES.
APPLICATION FILED AUG. 23, 1916.
1,287,227.
Patented Dec. 10, 1918.
4 SHEETS—SHEET 3.
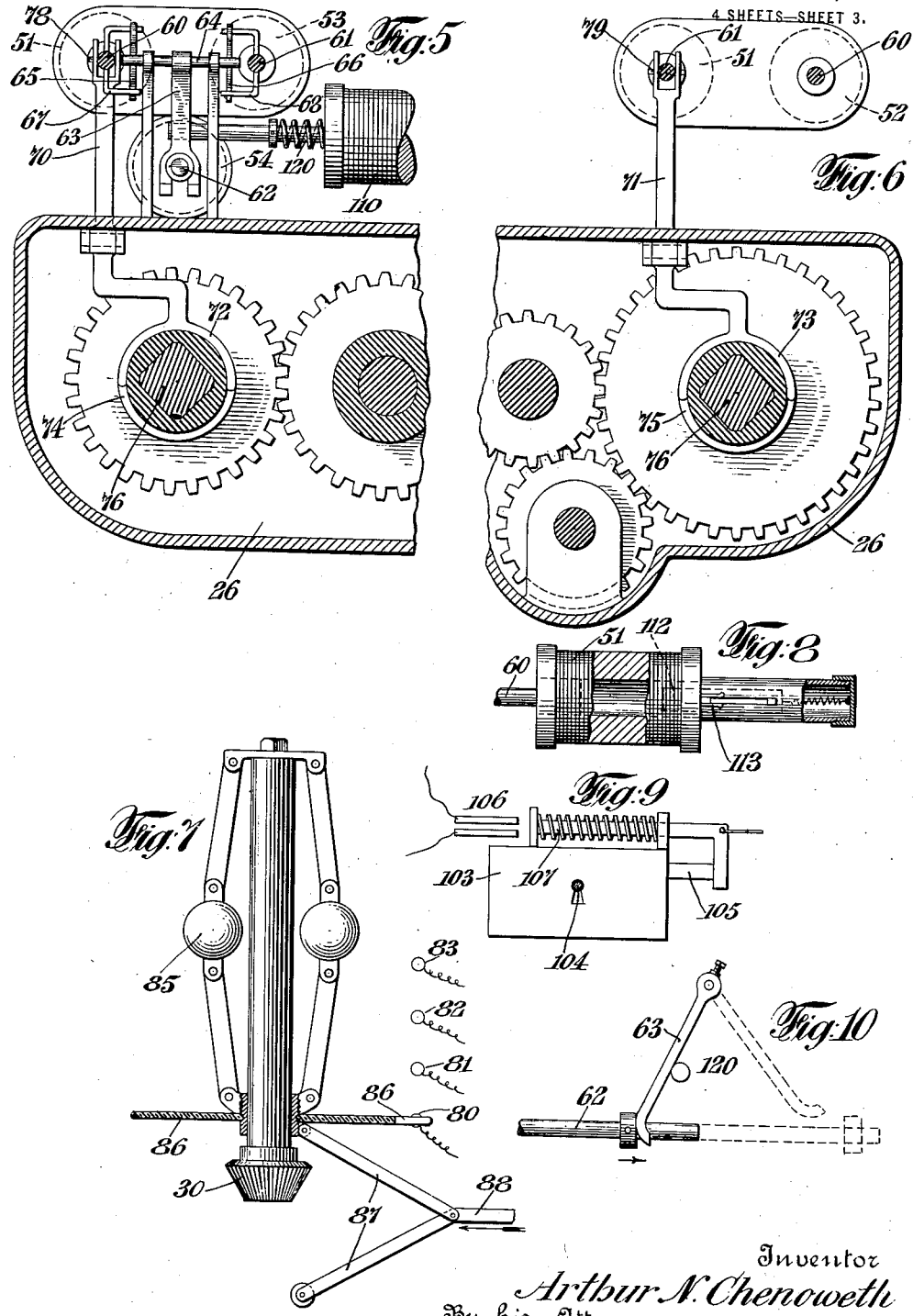

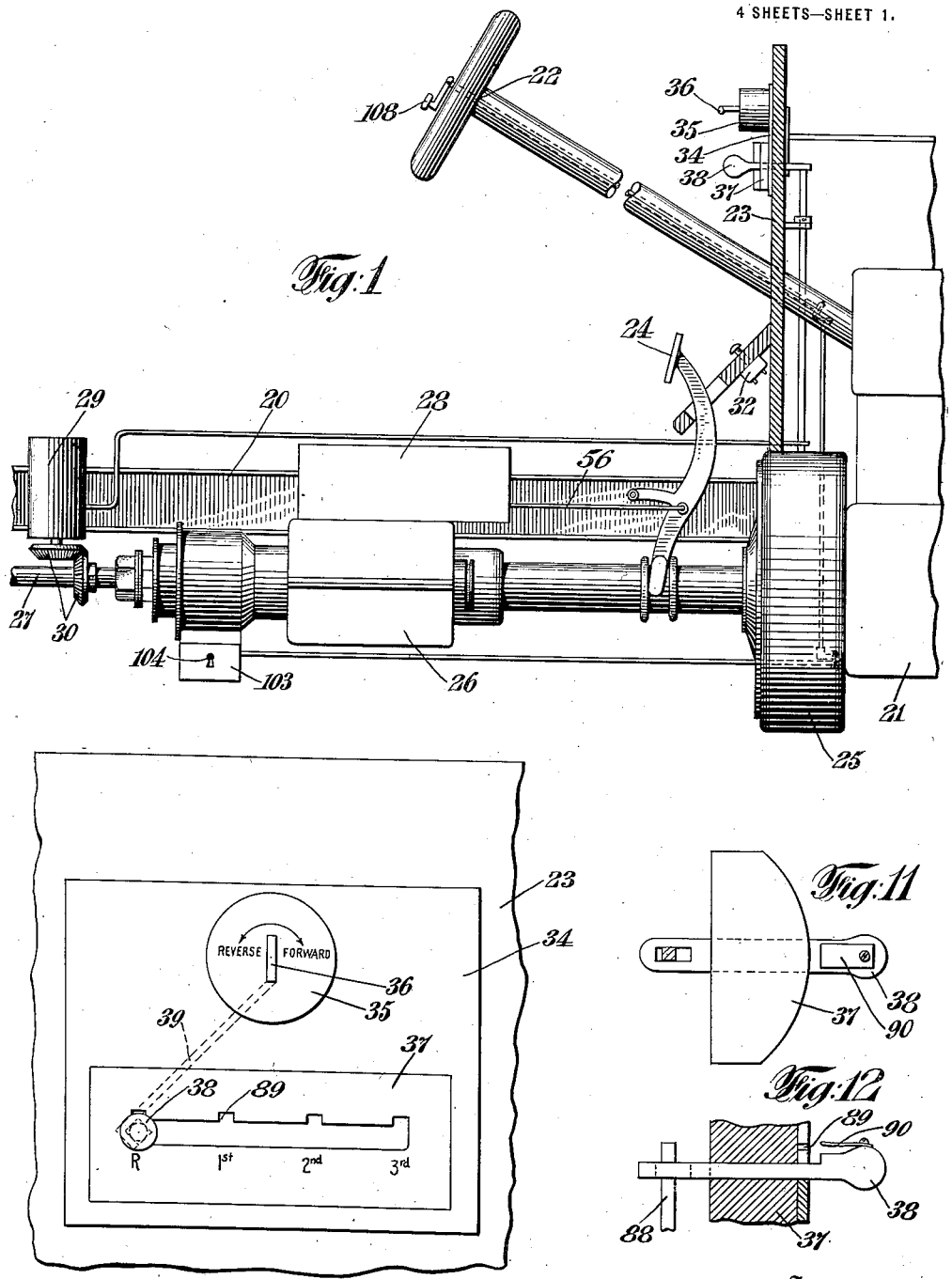

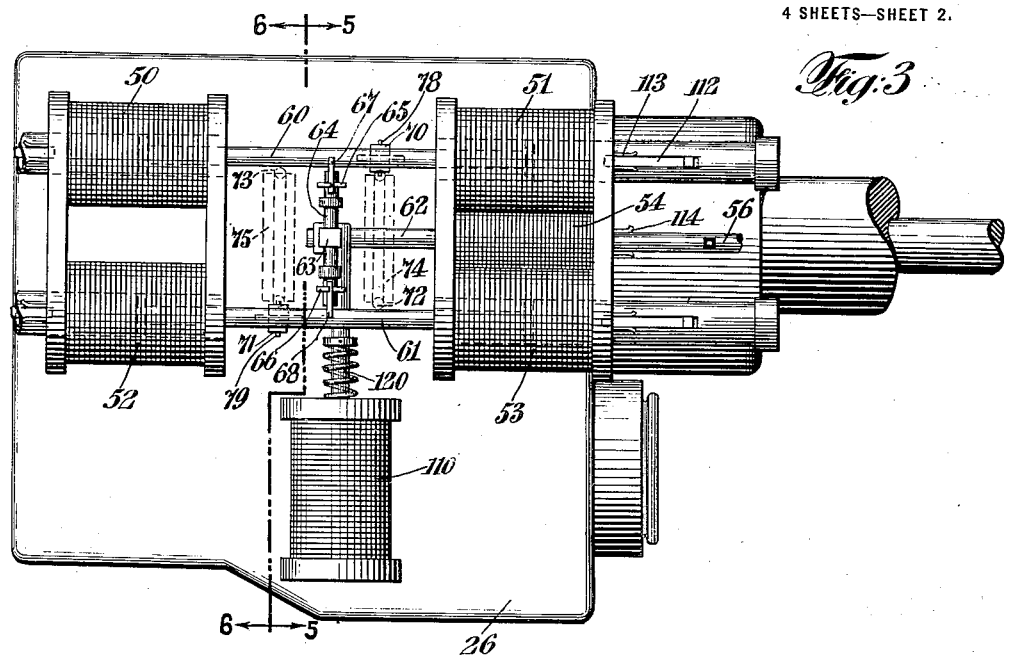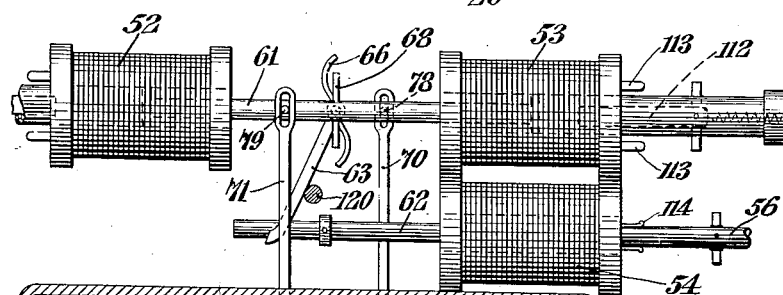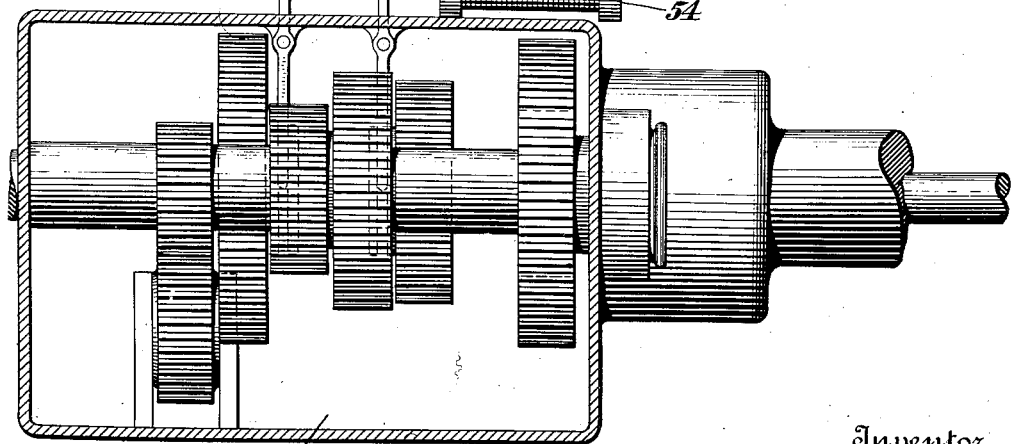

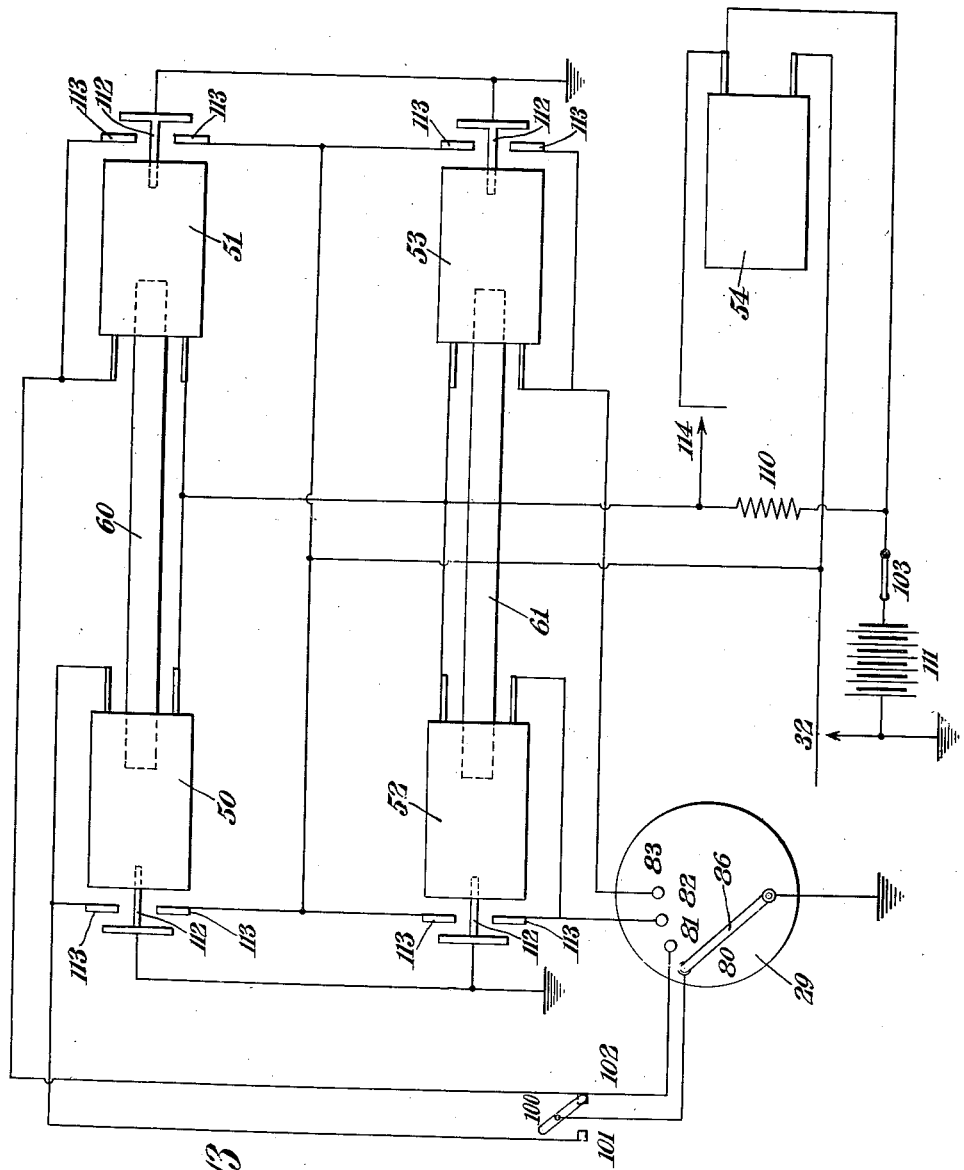

UNITED STATES PATENT OFFICE.

ARTHUR N. CHENOWETH, OF WATERBURY, CONNECTICUT.

AUTOMATIC GEAR-SHIFT FOR AUTOMOBILES.

1,287,227.　　　　　Specification of Letters Patent.　　Patented Dec. 10, 1918.

Application filed August 23, 1916. Serial No. 116,413.

*To all whom it may concern:*

Be it known that I, ARTHUR N. CHENOWETH, a citizen of the United States, and a resident of Waterbury, in the county of New Haven and State of Connecticut, have invented certain new and useful Improvements in Automatic Gear-Shift for Automobiles, of which the following is a specification.

The invention relates to improvements in electric gear changing mechanism for automobiles; and it has for its object to provide means whereby the sliding gears of the automobile transmission may be automatically shifted in accordance with the speed at which the automobile is traveling, the particular gears to be meshed being automatically selected through means controlled by the speed of the automobile and, therefore, selected independently of the speed of its motor. The invention has for a further object to provide mechanical means in connection with the aforesaid speed controlled means whereby the desired transmission gears may be manually selected and independently of the automatic speed control, should the latter for any reason fail, or to permit of engagement of a particular set.

In carrying out the invention, I employ a plurality of solenoids to shift the gears—one solenoid for each of the desired speeds, for example, first, second and third ahead and one speed reverse. A further solenoid is adapted to release the engine clutch and effects, also, the return of the transmission gears to a neutral position before shifting to a different speed. Means depending upon the speed of the automobile, as for example, a centrifugal governor operated from the driven shaft, are designed to control electrical connections of circuits to the various speed changing solenoids to effect the energization of a particular solenoid as the corresponding speed is attained by the vehicle.

The nature of the invention will be best understood when described in connection with the accompanying drawings, in which—

Figure 1 is a side elevation, partly in section of a portion of an automobile frame and mechanism, and illustrates the general arrangement of parts in carrying out the invention.

Fig. 2 is a fragmentary detail view of the control panel.

Fig. 3 is a plan of the gear shifting solenoids and also of the clutch and locking solenoids.

Fig. 4 is a side elevation of the same and of the transmission gearing.

Figs. 5 and 6 are vertical sections taken on the lines 6—5, Fig. 3, looking respectively in the direction of the arrows.

Fig. 7 is a detail view of the governor mechanism.

Fig. 8 is a detail fragmentary view of the solenoid contacts.

Fig. 9 is a detail view illustrating the locking switch.

Fig. 10 is a detail fragmentary view illustrating the clutch solenoid lock mechanism.

Figs. 11 and 12 are detail fragmentary views respectively in plan and vertical section of the operating handle and locking means for the manual control.

Fig. 13 is a wiring diagram of the electrical connections involved.

Similar characters of reference designate corresponding parts throughout the several views.

Referring to the drawings, more particularly to Figs. 1 and 2 thereof, 20 designates a suitable frame of an automobile of which a portion of the engine 21 is shown as well as the steering wheel and post 22, the dash board 23 and clutch pedal 24, clutch 25 and transmission casing 26, and driven shaft 27. In addition to the foregoing, there is provided a casing 28 containing the various controlling solenoids hereinafter referred to, and which is mounted upon the transmission casing 26; also, a casing 29 containing the governor for controlling the solenoids, the said casing being attached to frame 20, and the governor being operated from the driven shaft 27 through suitable bevel gears 30. The clutch 25 is spring-actuated for engagement, as is well understood; and its pedal 24 is located in the usual position on the automobile. A neutral position switch 32, moreover, is located in proximity to the pedal 24, and is adapted to be closed by the foot of the operator in depressing the said pedal.

Mounted on the dash board 23, conveniently to the operator, is the panel 34, on which is mounted the starting switch 35 adapted to receive a key 36, or in any other convenient manner to be turned in one direction or the other to start the vehicle either in forward or reverse direction. Below the same is located the manual control 37, which is provided with an operating handle 38 for the various speeds, the said control being interlocked as by means of an arm 39, whose end is turned over to engage the handle 38 of the said starting means 35. It will thus not be possible to start the vehicle manually or electrically until the key has been inserted and turned to the desired position.

In the solenoid casing 28 there are located six solenoids, Figs. 3 to 6, four of which are mounted as two oppositely disposed pairs, each pair having a common plunger rod. Of these solenoids, the solenoid 50 is adapted to control the reverse gearing, the solenoid 51, the gearing for slow or first speed forward, the solenoid 52, the gearing for medium or second speed forward, and the solenoid 53, the gearing for fast or third speed forward. It will be understood, of course, that further solenoids may be provided should additional speeds be desired. In addition to the aforesaid solenoids, there is mounted beneath and between the solenoids 51 and 53 a solenoid 54 which is adapted to restore the various transmission gears in the casing 26 to the neutral or non-meshing position, as well as to control the clutch 25, being connected to the clutch pedal 24 through rod 56.

60 designates the common plunger rod of the solenoids 50 and 51, and 61 the common plunger rod of the solenoids 52 and 53. The plunger rod 62 of the solenoid 54 is arranged to extend between and beneath the two rods 60 and 61, and through an arm 63 is adapted to rock a shaft 64 suitably mounted and carrying reversely curved or S-shaped arms 65 and 66 at its opposite ends. Extending inwardly from the rods 60 and 61 are U-shaped members 67 and 68 respectively and with which the arms 65 and 66 are adapted to coact to restore the corresponding plunger rods 60 and 61 to a neutral position whenever the solenoid 54 is energized and its rod 62 thereby drawn inwardly.

The gearing for the various speeds is shifted in well-known manner under the action of the solenoids through respective levers 70 and 71 provided at one end with forks 72 and 73 respectively to fit suitable collars 74 and 75 on the shaft 76 of the transmission gears. The other ends of the levers 70 and 71 are slotted and are adapted to receive pins 78 and 79 extending from the respective rods 60 and 61, whereby the levers are accordingly actuated as the corresponding solenoid is energized and as will be hereinafter more fully set forth.

To effect the energization of the solenoids to throw in the desired transmission gears, suitable means controlled by the speed of the vehicle are employed to close electrical circuits at contacts 80, 81, 82 and 83 corresponding to the various speeds, to wit—first and reverse speed, first speed, second speed and third speed forward respectively. A centrifugal governor 85 may be employed for this purpose and is designed to move a contact arm 86 to close a circuit at the aforesaid contacts in accordance with the speed of the vehicle, the governor being driven from shaft 27 through the bevel gears 30.

The contact arm 86 is also designed to be manually moved to effect the closing of the circuits at the various contacts. To this end, there is attached to the same one arm of a toggle device 87 which is adapted to be actuated from the handle 38 through suitable intermediate connections 88. By moving handle 38 to the desired position as indicated upon the control 37 and locking it in the corresponding notch 89 for the particular speed, for example, by pushing inwardly the said handle while temporarily depressing a spring locking member 90 thereon, the contact arm 86 will be moved to and locked upon the particular contact selected and the corresponding transmission gears maintained in mesh. It will be understood that when the handle 38 is not locked in one of the notches 89, it will partake of the motion of the contact arm 86 and may thus serve as an indicator of the particular transmission gears in mesh.

To start the vehicle in either reverse or first speed forward direction, the key 36 is inserted into lock 35 to operate a two-way starting switch 100, Fig. 13, having a contact 101 and 102, the former controlling the circuit to the reverse speed solenoid 50, and the latter the circuit to the first speed forward solenoid 51. A further switch 103, Figs. 1, 9 and 13, is provided whereby the vehicle may be locked against unauthorized use, the said lock being so designed that, in turning a key 104 thereof, bolt 105 will be retracted or advanced to close or open the circuit at contacts 106 through the action of a suitable spring-controlled contact member 107. Contact member 107, furthermore, may be caused to open the circuit at contacts 106 through the action of the throttle lever 108, suitably connected thereto, when the throttle is turned to cut off the gas supply.

Assuming that switch 103 is closed, the operations may be started by turning the two-way switch 100 to close the circuit at the contact 102. The circuit may then be traced as follows—from the ground through governor contact arm 86, contact 80, contact 102, solenoid 51, and resistance 110, which, in Fig. 3, is indicated in the nature of a solenoid whose purpose will be hereinafter set forth, switch 103, the battery 111, and back to the ground, thus completing the circuit. In view of the fact that the circuit includes the resistance 110, solenoid 51 will not be energized to its full capacity, but to a sufficient extent only to draw in its auxiliary plunger 112, which effects the closing of the circuit at the contacts 113 thereof. The closing of the circuit at said contacts 113 causes clutch solenoid 54 to become energized, holding the clutch out of engagement and moving the various gear shifters to throw the corresponding gears out of mesh and into a neutral position. At the same time, a switch 114 is closed thereby, shunting the resistance 110 and permitting the full current to flow through solenoid 51, which is caused to draw in its plunger 60, and shifts the gears to the first speed forward position. At the end of the travel, the inner end of plunger 60 contacts with the abutting end of auxiliary plunger 112, and breaks the circuit at the contacts 113. This opens the circuit, allowing the return of the clutch solenoid plunger 62 to normal position, with the gears set for first speed forward, where they remain until the speed of the governor under increased speed of the vehicle closes the circuit at the contact 82 when, similarly, solenoid 52 will be energized to effect the shifting of the gears to the corresponding position for the second speed forward. When the circuit is open at contacts 113, clutch solenoid 54 will be deenergized, and the clutch left free to be thrown into engagement. Switch 114 is also opened thereby, throwing the resistance 110 into circuit for the next shift of gears. The neutral switch 32 which is placed forward of the clutch pedal is designed to effect the disengagement of any gear in mesh when the clutch is disengaged, by closing the circuit directly through the clutch solenoid. When the gears are in neutral position, the energization of the clutch solenoid has the effect merely of causing plunger 62 to pass under arm 63 without affecting same, as is indicated in dotted lines, Fig. 10.

The resistance coil 110 may be in the form of a solenoid adapted to automatically lock the gears in neutral position, and to free the same automatically previous to any change in the gears. To this end, a plunger 120, spring-urged outwardly and controlled thereby, is arranged to be moved transversely to lever 63, locking the shifter forks 72 and 73 to prevent the same from being actuated to shift the gears. As soon as coil 110 is energized, the plunger 120 is drawn inwardly, freeing the arm 63 to permit the plunger of the particular solenoid energized to shift the gears.

I claim:

1. Automatic speed gear change mechanism for automobiles, comprising suitable change gears, and shifters therefor; electromagnetic means for positioning the shifters to effect a particular engagement; electromagnetic means common to the automobile clutch and said shifters to disengage the clutch, a rock shaft controlled thereby, and means thereon to engage the plungers of the first-named electro-magnetic means and position the same and the said shifters in neutral position; circuits to said electromagnetic means and including a source of current; automatic means to govern the actuation of said electro-magnetic means; and a switch device to initiate the action of the automatic means to render possible the automatic shifting of said gears.

2. Automatic speed gear change mechanism for automobiles, comprising suitable change gears, and shifters therefor; electromagnetic means for positioning the shifters to effect a particular engagement; electromagnetic means common to the automobile clutch and said shifters to disengage the clutch, a rock shaft controlled thereby, and means thereon to engage the plungers of the first-named electro-magnetic means and position the same and the said shifters in neutral position; circuits to said electro-magnetic means and including a source of current; automatic means to govern the actuation of said electro-magnetic means; a switch device to initiate the action of the automatic means to render possible the automatic shifting of said gears; and electromagnetic means to lock the shifters in neutral position.

3. Automatic speed gear change mechanism for automobiles, comprising suitable change gears, and shifters therefor; electromagnetic means for positioning the shifters to effect a particular engagement; electromagnetic means common to the automobile clutch and said shifters to disengage the clutch, a rock shaft controlled thereby, and means thereon to engage the plungers of the first-named electro-magnetic means and position the same and the said shifters in neutral position; circuits to said electro-magnetic means and including a source of current; automatic means to govern the actuation of said electro-magnetic means; a switch device to initiate the action of the automatic means to render possible the automatic shifting of said gears; and manually-operated means to select the change gears for a particular speed.

5. Automatic speed gear change mechanism for automobiles, comprising suitable change gears, and shifters therefor; electro-magnetic means for positioning the shifters to effect a particular engagement; electro-magnetic means to disengage the clutch and position the shifters in neutral position; circuits to said electro-magnetic means and including a source of current; automatic means to govern the actuation of said electro-magnetic means; a switch device to initiate the action of the automatic means to render possible the automatic shifting of said gears; and means to afford a visual indication of the change gears in action.

5. Automatic speed gear change mechanism for automobiles, comprising suitable change gears, and shifters therefor; electro-magnetic means for positioning the shifters to effect a particular engagement; electro-magnetic means to disengage the clutch and position the shifters in neutral position; circuits to said electro-magnetic means and including a source of current; automatic means to govern the actuation of said electro-magnetic means; a switch device to initiate the action of the automatic means to render possible the automatic shifting of said gears; and a lock and key device to disconnect the said source of current.

6. In automatic speed gear change mechanism for automobiles, comprising suitable change gears, shifters therefor, and electro-magnetic means for positioning the shifters to effect a particular engagement; circuits to said electro-magnetic means and including a source of current; automatic means to govern the actuation of said electro-magnetic means and including contact mechanism controlled by said electro-magnetic means under a relatively weak current and under a relatively large current.

7. In automatic speed gear change mechanism for automobiles, comprising suitable change gears, shifters therefor, and electro-magnetic means for positioning the shifters to effect a particular engagement; circuits to said electro-magnetic means and including a source of current; automatic means to govern the actuation of said electro-magnetic means and including contact mechanism controlled by said electro-magnetic means under a relatively weak current and under a relatively large current; resistance included in circuit with the electro-magnetic means; and means to cut out said resistance.

8. In automatic speed gear change mechanism for automobiles, comprising suitable change gears, shifters therefor, and electro-magnetic means for positioning the shifters to effect a particular engagement; contact mechanism controlled by said electro-magnetic means under a relatively weak current and under a relatively large current; electro-magnetic means adapted to lock said shifters in neutral position and in circuit with the first-named electro-magnetic means, and of such resistance as to afford sufficient current only to close said contact mechanism, whereupon said last-named electro-magnetic means will be shunted and sufficient current afforded to the first-named electro-magnetic means to effect a particular engagement and to open said contact mechanism; electro-magnetic means to disengage the clutch and position the shifters in neutral position; and circuits to said electro-magnetic means and including a source of current.

9. Automatic speed gear change mechanism for automobiles, comprising suitable change gears, and shifters therefor; electro-magnetic means for positioning the shifters to effect a particular engagement; electro-magnetic means to disengage the clutch and position the shifters in neutral position; circuits to said electro-magnetic means and including a source of current; automatic means controlled by the speed of the vehicle to govern the actuation of said electro-magnetic means; a switch device to initiate the action of the automatic means to render possible the automatic shifting of said gears; and means to retain a particular set of gears in mesh irrespective of the speed of the vehicle.

10. Automatic speed gear change mechanism for automobiles, comprising suitable change gears, and shifters therefor; electro-magnetic means for positioning the shifters to effect a particular engagement; electro-magnetic means to disengage the clutch and position the shifters in neutral position; circuits to said electro-magnetic means and including a source of current; automatic means to govern the actuation of said electro-magnetic means; a switch device to initiate the action of the automatic means to render possible the automatic shifting of said gears; and means connected with the throttle of the automobile to disconnect the source of current.

11. Automatic speed gear change mechanism for automobiles, comprising suitable change gears, and shifters therefor; electro-magnetic means for positioning the shifters to effect a particular engagement; electro-magnetic means to simultaneously disengage the automobile clutch and position the shifters in neutral position; electro-magnetic means adapted to engage said shifting mechanism to lock the same in neutral position; circuits to said electro-magnetic means and including a source of current; contact mechanism controlled by said shifter electro-magnetic means under a relatively weak current and under a relatively large current, said shifter electro-magnetic means being in circuit with the said locking electro-magnetic means and whose resistance is such as to afford sufficient current only to close the said contact mechanism, upon which closure the clutch electro-magnetic means will be energized; contact mechanism controlled by said clutch electro-magnetic means to be closed upon the energization of the clutch electro-magnetic means and to shunt thereby the locking electro-magnetic means, whereupon sufficient current will be afforded the said shifter electro-magnetic means to effect a particular engagement and to open the said contact mechanism.

Signed at Waterbury, in the county of New Haven and State of Connecticut this 18" day of August, A. D. 1916.

ARTHUR N. CHENOWETH.

Witnesses:
MYRA M. SOMERS,
CAROLINE E. BENHAM.